United States Patent [19]

Goto

[11] 4,413,334
[45] Nov. 1, 1983

[54] PICKUP ARM WITH SERVO-CONTROLLED STYLUS

[75] Inventor: Kunio Goto, Yokohama, Japan

[73] Assignee: Victor Company of Japan, Limited, Yokohama, Japan

[21] Appl. No.: 259,486

[22] Filed: May 1, 1981

[30] Foreign Application Priority Data

May 4, 1980 [JP] Japan ................................ 55-58829

[51] Int. Cl.³ .......................... G11B 21/10; G11B 9/06
[52] U.S. Cl. ...................................... 369/126; 369/43; 369/170; 369/215
[58] Field of Search .................... 369/43, 44, 113, 126, 369/130, 139, 170, 181, 219, 220, 184, 215; 358/342, 907

[56] References Cited

U.S. PATENT DOCUMENTS

| 3,830,505 | 8/1974 | Rabinow | 369/43 |
| 4,063,285 | 12/1977 | Nagaoka | 369/130 |
| 4,170,360 | 10/1979 | Ohsawa | 369/181 |
| 4,320,487 | 3/1982 | Guarracini et al. | 369/43 |
| 4,325,134 | 4/1982 | Langley et al. | 369/126 X |

*Primary Examiner*—Bernard Konick
*Assistant Examiner*—Donald McElheny, Jr.
*Attorney, Agent, or Firm*—Lowe, King, Price & Becker

[57] ABSTRACT

A capacitance detection type stylus is attached to the free end of a cantilever which is supported on a vertically movable resilient pivot. A permanent magnet is fixed to the movable pivot. A servo-control coil is provided adjacent the permanent magnet to move it in response to angular displacement of the cantilever from a predetermined position. The pivot is moved in the direction of fluctuation of a disc record to maintain the stylus in a proper orientation with respect to the record surface.

6 Claims, 9 Drawing Figures

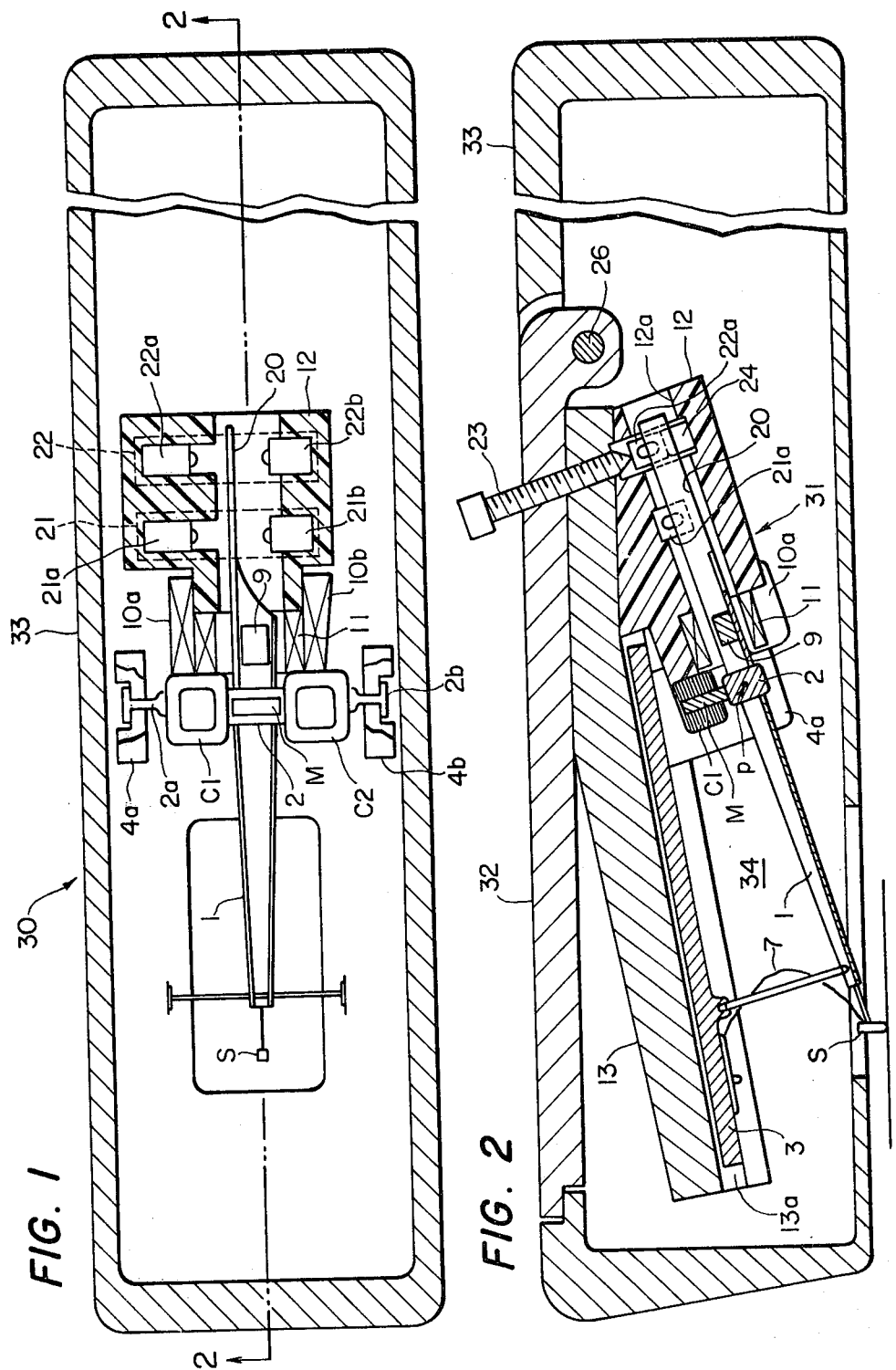

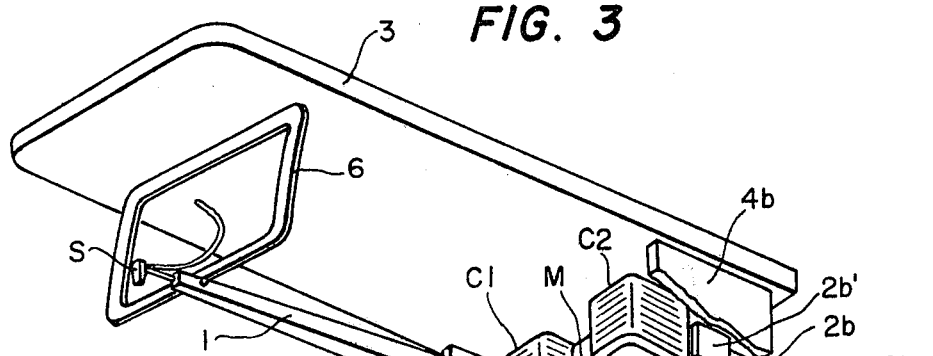
FIG. 3
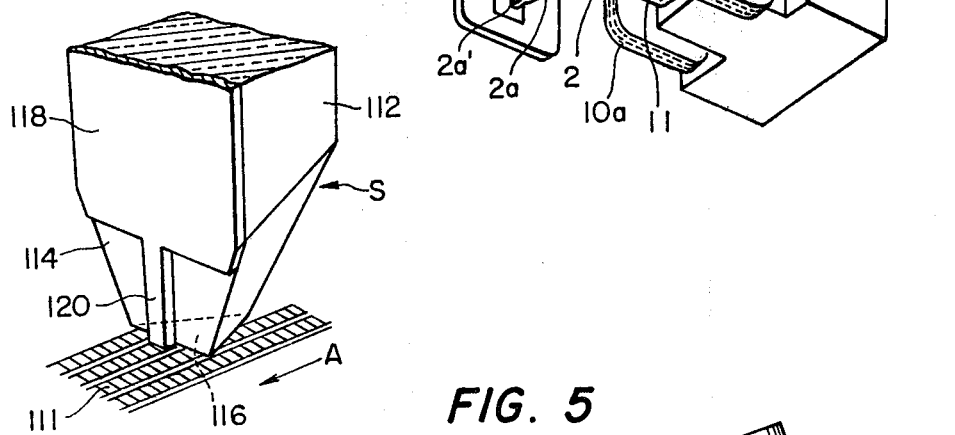
FIG. 4
FIG. 5
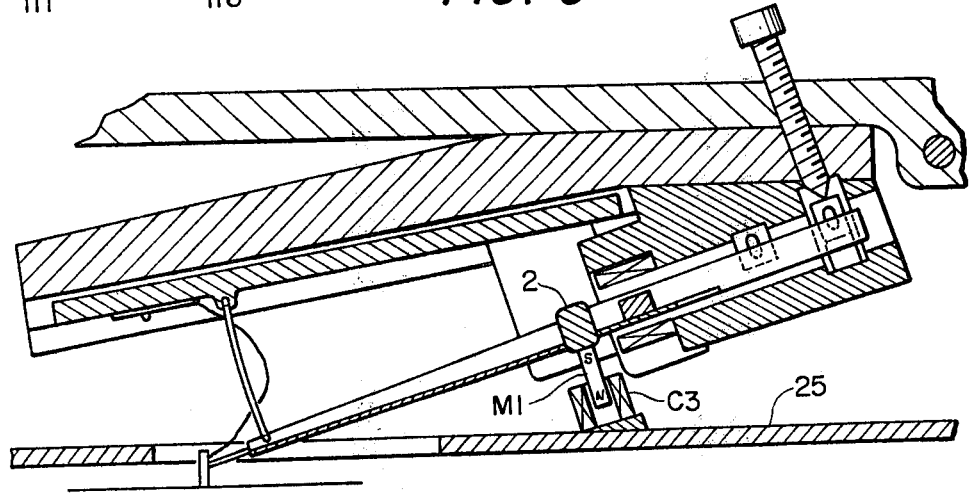

PICKUP ARM WITH SERVO-CONTROLLED STYLUS

BACKGROUND OF THE INVENTION

The present invention relates to a pickup arm of the type wherein the stylus is maintained in a predetermined orientation with respect to the surface of record disc regardless of varying levels of the record disc. More specifically, the invention relates to a capacitance detection type pickup arm.

The capacitance type pickup stylus for video disc playback systems comprises a diamond body which rests on several tracks in which signals are recorded in the form of minute pits. An electrode is attached to the rear face of the diamond body to read just one information signal. The electrode is required to be oriented in a proper direction with respect to the surface of the disc record to maintain the pickup level of the stylus regardless of the fluctuating level of the disc record. Since the stylus is attached to the free end of a cantilever, the fluctuation of the surface of disc record causes the stylus to misorient itself with respect to the record, so that the leading or trailing edge of the stylus would impair the record as it spins at high speeds.

SUMMARY OF THE INVENTION

The present invention contemplates to use a canitlever which is supported on a vertically movable resilient pivot and a servomechanism which causes the resilient pivot to move as a function of a correction signal representative of the amount and direction of vertical displacement of the cantilever from a predetermined position, so that the stylus is maintained in a proper orientation with respect to the surface of a disc record regardless of the fluctuation of its surface level.

In a practical embodiment, the correction signal is derived from a pair of sensing devices located at different positions from the pivot and an extension arm is secured to the cantilever and extends in a direction opposite to the cantilever. The sensing devices generates signals representative of the vertical displacements of the different positions of the extension arm from a predetermined level. A differential amplifier is responsive to the signals from the sensing devices to detect the vertical angular displacement of the cantilever.

Accordingly, the primary object of the invention is to provide a pickup arm which maintains its stylus in a proper orientation with respect to the surface of a disc record to prevent it from being impaired by the stylus as the record fluctuates in elevation.

BRIEF DESCRIPTION OF THE DRAWINGS

The invention will be further described by way of example with reference to the accompanying drawings, in which:

FIG. 1 is an illustration of a plan view of the inside of a pickup arm of the invention;

FIG. 2 is an illustration of a cross-sectional view taken along the lines 2—2 of FIG. 1;

FIG. 3 is an illustration of a perspective view of the pickup assembly of FIGS. 1 and 2;

FIG. 4 is an illustration of a perspective view of the stylus employed in the invention;

FIG. 5 is an illustration of an alternative embodiment of the invention;

DETAILED DESCRIPTION

Figure 6A:
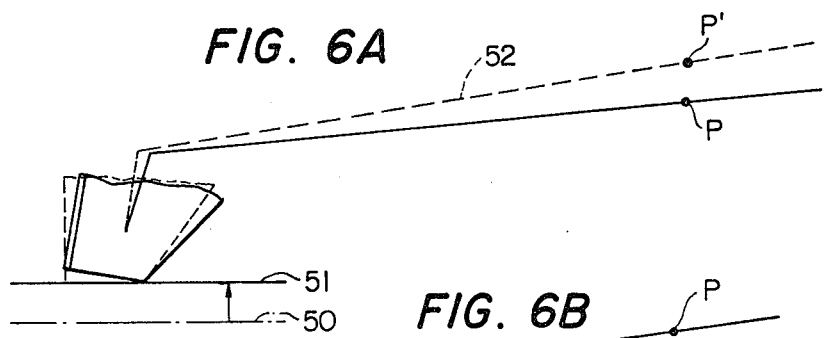
FIGS. 6A and 6B are schematic illustrations of the operating principle of the invention.

In FIGS. 1 to 3 an embodiment of the present invention is illustrated. A pickup arm of the invention, generally indicated at 30, comprises a pickup assembly indicated generally at 31 which is shown secured to the underside of a lid 32. The lid 32 forms part of an arm housing 33 which is linearly driven across the tracks of recording medium by a drive system, not shown. The pickup assembly 31 comprises a stylus assembly designated generally by 34, a guide member 13 attached to the lid 32, and a mounting block 12 secured to the guide member 13 for supporting electromagnetic driving coils 10a, 10b, 11, C1 and C2 and optoelectrical assemblies 21, 22 to be described in detail later. The stylus assembly 34 comprises a support plate 3, a centilever 1 which carries a stylus S and is loosely supported at its free end to the support plate 3 by a framed structure 6 as best seen in FIG. 3. The cantilever 1 is secured to a pivot block 2 which is also secured a pair of oppositely extending pivot arms 2a and 2b. The pivot arms 2a and 2b, which are preferably formed of a resilient member, are mounted on a pair of trunnions 4a and 4b depending from the support plate 3. Each of the pivot arms 2a, 2b has a narrowed portion 2a' (2b') near the trunnions to impart resilience to the cantilever 1 sufficient to move its pivot point in vertical direction while at the same time pivotally supporting the cantilever about a point P. To the rear side of the pivot block 2 is secured an extension arm 20 for pivotal movement in unison with the cantilever 1. The rear extension arm 20 extends through a bore 12 formed in the mounting block 12. The optoelectrical assemblies 21, 22 include light sources, preferably light emitting diodes 21a, 22a arranged on one side of the bore 12 and photosensors such as photodiodes 21b, 22b arranged on the other side of the bore to receive light beams emitted from the associated light sources 21a, 22a, respectively. The light beams are intercepted by the extension arm 20, resulting in variations in electrical outputs from the photodiodes 21b, 22b as a function of the angular displacement of the cantilever 1 from a predetermined position. A permanent magnet M is fixed on the pivot block 2 so that it can move vertically in the space formed between the coils C1 and C2. The guide member 12 is formed with a pair of longitudinally extending grooves 13a to receive therein the support plate 3. The lid 32 is pivoted at 26 to be manually raised to a titled position to allow the stylus assembly 34 to be easily mounted on the pickup assembly 31.

An example of the reproducing stylus S is shown in detail in FIG. 4 as resting over several spiral tracks 111 of a grooveless capacitance disc in which signals are stored as capacitance variations produced by minute pits. The stylus S compares a diamond body 112 which is shaped to form a rear face 114 and a bottom, or contact, face 116 making contact with the disc moving in the direction of arrow A when in operation. The contact face 116 has a width covering several tracks as shown and takes a triangular shape, for example. On the rear face 114, which is preferably at approximately 90 degrees to the contact face 116, is a stylus electrode 118 having a narrow strip 120 extending downwardly to the contact face 116. The electrode 118 makes contact with one track to read just one information signal and a tracking signal which may be recorded on either side of it or interleaved with the information signal on a common track. The signals detected by the electrode 118 are transmitted through lead 7 to an external circuit where the tracking signal is separated from the information signal and applied to the coil 11 in a known manner to keep the stylus S on the right path. For this purpose a permanent magnet 9 is fastened to the rear extension arm 20 and encircled by the servo control coil 11. The coils 10a and 10b are provided for the purpose of compensating for jitter errors by controlling the stylus position in the longitudinal direction of the track.

Figure 7:
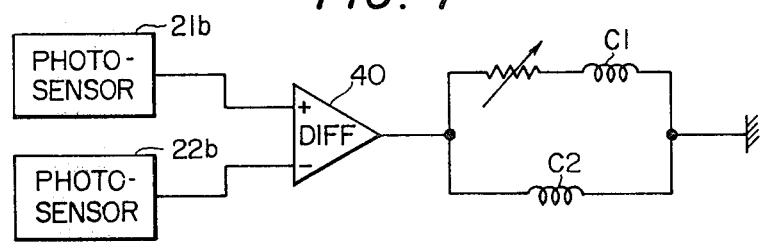
FIG. 7 is an illustration of a servo-control circuit.
Figure 8:
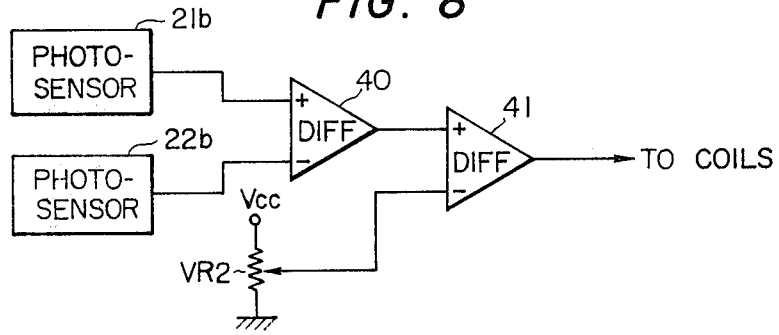
FIG. 8 is an illustration of a modified servo-control circuit of FIG. 7.

The output signals from the photodiodes 21b and 22b are applied to a differential amplifier 40 as illustrated in FIG. 7. The light emitting diode 22a is adjusted in vertical position by means of an adjustment screw 23 and an elastic member 24 on which the light-emitting diode 22 is disposed so that when the stylus S is in a proper operating position the output of the differential amplifier 40 is substantially zero. The amplitude and polarity of the differential amplifier 40 thus provide an indication of the amount and direction of the angular displacement of the cantilever from the operating position. The differential amplifier 40 feeds its output to the coils C1 and C2 which may either be parallel or serially connected to each other. In the parallel connection, as shown in FIG. 7, a variable resistor VR1 is provided in the circuit of coil C1 to adjust its coil current relative to coil C2. It can be seen that the coils C1 and C2 are energized to cause the permanent magnet M to move in a vertical direction to counteract the angular displacement of the cantilever 1 from the intended position.

Figure 6B:
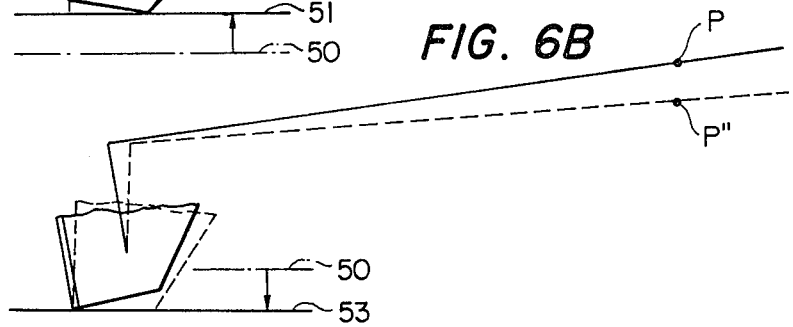

As illustrated in FIG. 6A, the stylus S is tilted so that its forward leading edge makes contact with the surface of a disc record when the latter is raised from the normal positon indicated at 50 to an upward position 51, the coils C1, C2 are energized in a sense that cause the pivot block 2 to move from the normal pivot point P to a raised point P' due to the resiliency of the pivot arms 2a, 2b. As a result, the cantilever 1 is raised to a position marked 52 to return the stylus S to the normal position in which its contact face 116 is parallel with the record surface 51. Conversely, a downward movement of the record surface to a level 53, shown in FIG. 6B, will cause the trailing edge of the stylus S to make contact with the record surface as shown in FIG. 6B. In this instance, the coils C1, C2 are energized in an opposite sense to move the cantilever to a downward position marked P''. Thus, the contact face 116 of the stylus is made to keep parallel relationship with the record surface.

The adjustment screw 23 may be eliminated by an arrangement shown in FIG. 7 in which the output of the differential amplifier 40 is coupled to the noninverting input of a second differential amplifier 41. The second differential amplifier 41 has its inverting input connected to a variable voltage reference source formed by a potentiometer VR2 and supplies its output to the coils C1, C2. The potentiometer VR2 is adjusted so that the output of the comparator 41 is substantially zero when the stylus S is the proper operating position.

The servo control coils C1 and C2 may be replaced with a single coil indicated at C3 in FIG. 5 in which the coil 3 is mounted on the bottom 25 of the arm housing in a position tilted vertically toward the stylus S to permit insertion of a permanent magnet M1 depending from the pivot block 2.

What is claimed is:
1. A system for controlling the orientation of a stylus with respect to the surface of a recording medium having radially spaced apart tracks, said stylus being provided at one end of a pickup arm linearly driven across said tracks, comprising:
   pivotal support means mounted at said one end of the pickup arm and pivotable in a direction normal to said recording medium surface;
   a cantilever having said stylus at one end thereof and coupled at the other end thereof to said pivotal support means, said cantilever having a substantially smaller mass then said pickup arm;
   means for detecting the angular displacement of said cantilever from a predetermined orientation caused by displacement of said recording medium from a normal level and in response generating a control signal; and
   means for moving said pivotal support means in response to said control signal in the direction of vertical displacement of said recording medium.

2. A control system for controlling the orientation of a stylus with respect to the surface of a recording medium having radially spaced apart tracks, said stylus being provided at one end of a pickup arm linearly driven across said tracks and formed of an insulative body having a contact face which rests on a plurality of tracks of said recording medium and an electrode attached to a surface of said insulative body at an angle to said contact face, said contact face being parallel to the surface of said recording medium when said surface is at a predetermined normal level, comprising:
   pivotal support means mounted at said one end of the pickup arm and pivotable in a direction normal to said surface;
   a cantilever having said stylus at one end thereof and coupled at the other end thereof to said pivotally supporting means, said cantilever having a substantially smaller mass than said pickup arm;
   means for detecting the angular displacement of said cantilever from a predetermined angular position as a result of a displacement of the surface of said recording medium from said normal level and in response generating a control signal; and
   means responsive to said control signal for moving said pivotal support means in the direction of displacement of said surface to maintain said contact face of said stylus in a parallel relationship with said surface.

3. A system as set forth in claim 1 or 2, wherein said cantilever includes an extension arm, and wherein said detecting means is located ajdacent said extension arm for detecting the angular displacement of said extension arm from a predetermined position.

4. A system as set forth in claim 3, wherein said detecting means comprises a pair of first and second electrooptical sensing means which are spaced apart in the direction of said extension arm to sense the amounts of the angular displacement of said extension arm at different locations from said pivot and in response generating first and second output signals, respectively, and means coupled to said first and second electrooptical sensing means for generating said control signal representative of the difference between said first and second output signals.

5. A control as set forth in claim 4, wherein said moving means comprises a permanent magnet fixed to a pivot point of said cantilever and a coil stationarily mounted adjacent said permanent magnet for moving said permanent magnet in response to said control signal.

6. A system as claimed in claim 1, wherein said pivotal support means comprises a pair of supports secured to said pickup arm and a pair of interconnected arms extending opposite each other from a pivot point of said cantilever and resiliently coupled respectively to said supports.

* * * * *